(12) United States Patent
Burns et al.

(10) Patent No.: US 10,110,913 B2
(45) Date of Patent: Oct. 23, 2018

(54) MOTION ESTIMATION USING HYBRID VIDEO IMAGING SYSTEM

(71) Applicant: INTEL CORPORATION, Santa Clara, CA (US)

(72) Inventors: Geoffrey F. Burns, Palo Alto, CA (US); Vinesh Sukumar, Fremont, CA (US); Tae-hoon Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 15/282,354

(22) Filed: Sep. 30, 2016

(65) Prior Publication Data

US 2018/0098082 A1    Apr. 5, 2018

(51) Int. Cl.
*H04N 19/51* (2014.01)
*H04N 19/117* (2014.01)
*G06K 9/00* (2006.01)

(52) U.S. Cl.
CPC ........... *H04N 19/51* (2014.11); *H04N 19/117* (2014.11)

(58) Field of Classification Search
CPC .............................. H04N 19/51; H04N 19/117
USPC ..................................................... 375/240.16
See application file for complete search history.

(56) References Cited

U.S. PATENT DOCUMENTS

| 6,438,275 | B1 | 8/2002 | Martins |
| 9,131,073 | B1 | 9/2015 | Bankoski |
| 2006/0062306 | A1 | 3/2006 | Ha |
| 2009/0161011 | A1 | 6/2009 | Hurwitz |
| 2012/0328025 | A1 | 12/2012 | Chang |
| 2014/0363049 | A1* | 12/2014 | Benosman ......... G06K 9/00771 382/103 |

OTHER PUBLICATIONS

International Search Report dated Oct. 31, 2017 for International Patent Application No. PCT/US2017/046310, 3 pages.
Written Opinion of the International Searching Authority dated Oct. 31, 2017 for International Patent Application No. PCT/US2017/046310, 6 pages.
Benosman, R. et al., "Event-Based Visual Flow", IEEE Transactions on Neural Networks and Learning Systems, Feb. 2014, vol. 25, pp. 407-417.

(Continued)

*Primary Examiner* — Hee-Yong Kim
(74) *Attorney, Agent, or Firm* — Finch & Maloney PLLC (57) ABSTRACT

Techniques are provided for motion estimation using hybrid video imaging based on frame-based capture and event-based capture. A methodology implementing the techniques according to an embodiment includes receiving a sequence of pixel events, generated asynchronously by an event-based video camera, and receiving a sequence of image frames generated by a frame-based video camera at a frame sampling period. The method also includes integrating a subset of the sequence of pixel events, occurring within the frame sampling period between two of the image frames, to generate a pixel motion vector representing motion of the pixel between the two image frames. The method further includes mapping the pixel motion vector to a tile of one of the image frames to generate an estimated motion vector associated with that tile.

24 Claims, 8 Drawing Sheets

(56) References Cited

OTHER PUBLICATIONS

Lichtsteiner, P. et al., "A 128×128 120 dB 15 μs Latency Asynchronous Temporal Contrast Vision Sensor", IEEE Journal of Solid-State Circuits, Feb. 2008, vol. 43, pp. 566-576.
Posch, C. et al., "Giving Machines Humanlike Vision similar to our own would let devices capture images more efficiently", Spectrum IEEE International, Dec. 2015, 3 pages.
Raket, Lars L. and Soren Forchhammer, "Optical Flow Driven Frame Interpolation", Optical Society of America, 2012, 3 pages.
Wiegand, T. and Girod, B., "Image and Video Compression", Stanford University Class Notes EE398A, 2012, 33 pages.

* cited by examiner

Frame camera capture
602

Event camera capture
604

MOTION ESTIMATION USING HYBRID VIDEO IMAGING SYSTEM

BACKGROUND

Estimation of motion between frames of a video sequence is a common task in many types of video processing applications. Unfortunately, such motion vector estimation typically consumes a large share of available processing and memory resources, and this may force implementers to make tradeoff decisions between accuracy and complexity. Additionally, when motions vectors are derived from a temporal sequence of video frames, accuracy problems arise due to the limited video frame rates that are generally available, blurring of rapidly moving objects, and the appearance of occluding objects that move through the frames.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for improved motion estimation using hybrid video imaging, based on a combination of frame-based capture and event-based capture. Estimation of motion between frames of a video sequence is a common task in many types of video processing applications, but can often be computationally intensive and subject to error due to video frame rate limitations. The disclosed techniques, however, utilize an event-based camera, in combination with a conventional frame-based video camera, to compute motion estimation with greater temporal resolution and increased efficiency. Motion vectors are calculated from asynchronously generated pixel motion events provided by the event-based camera, as described below. These pixel motion vectors are then mapped to tiled regions of the image frames provided by the frame-based camera to estimate motion of the tiles from frame to frame or between frames.

In accordance with an embodiment, the disclosed techniques can be implemented, for example, in a computing system or a graphics processing system, or a software product executable or otherwise controllable by such systems. The system or product is configured to receive a sequence of pixel events, generated by an event-based video camera, and sequence of image frames, generated by a frame-based video camera. The events, which represent illumination change in a pixel, are captured asynchronously with relatively high temporal resolution. The frames are captured at a generally constant frame sampling rate with lower temporal resolution. The frames are subdivided into many smaller regions or tiles, for which motion vectors are desired. The system is further configured to integrate a subset of the sequence of pixel events that occur within a time period between two of the image frames. The integration generates a pixel motion vector representing motion of the pixel over some portion (or all) of the time between the two image frames. The system is further configured to map the pixel motion vector to a tile of one of the image frames to generate an estimated motion vector associated with that tile.

Figure 1:
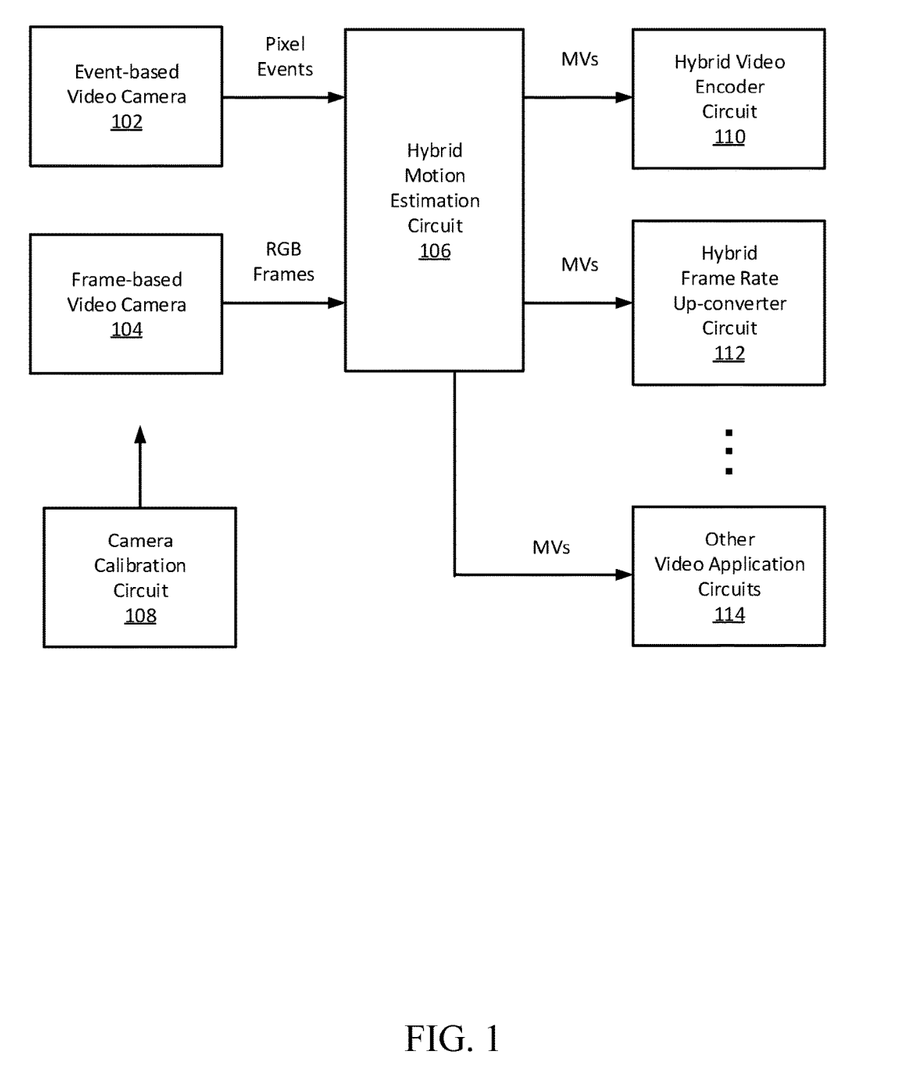
FIG. 1 is a top level diagram of an implementation of a system for hybrid motion estimation, configured in accordance with certain embodiments of the present disclosure.

The techniques described herein may allow for improved motion estimation, compared to existing methods that rely solely on frame-based video capture. The used of event-based capture provides higher temporal resolution, due to the asynchronous nature of the capture, and increased efficiency since much of the chain of processing is limited to only those pixels that change values. This efficiency may also reduce power requirements and allow for the implementation to be hosted on a broader range of computing and communication platforms. These techniques may further be implemented in hardware or software or a combination thereof FIG. 1 is a top level diagram 100 of an implementation of a system for hybrid motion estimation, configured in accordance with certain embodiments of the present disclosure. A hybrid motion estimation circuit 106 is configured to accept pixel events generated by an event-based video camera 102 along with image frames provided by a frame-based video camera 104. At a high level, the circuit 106 generates motion vectors from a hybrid combination of these inputs, as will be described in detail below, to achieve greater temporal accuracy and reduced computational complexity compared to methods that rely solely on frame-based video. Hybrid motion estimation circuit 106 is also configured to provide the motion vectors to one or more video applications such as, for example, the hybrid video encoder circuit 110 and/or the hybrid frame rate up-converter circuit 112, the operations of which will also be described in greater detail below.

The frame-based video camera 104 includes a sensor that is configured to capture a 2-dimensional (2D) array of pixels for each frame. The 2D array has a width of x pixels and a height of y pixels. In some embodiments, the image frames may be in a red-green-blue (RGB) format, a luma-chrominance (YUV) format, black and white, or any other suitable format. The image frames are generally captured at a fixed sampling or frame rate. For example, film is typically recorded at 24 frames per second (fps), 25 fps, or 30 fps, while broadcast video may be provided at 50 Hz or 60 Hz, although other frame rates are possible.

In contrast, the event-based video camera 102 is configured to record image dynamics asynchronously, for example as they occur, rather than at a pre-determined frame rate. In some embodiments, the event-based camera may employ a dynamic (or differential) vision sensor (DVS) to record the image dynamics. As such, events associated with changes in any pixel can be captured with a much greater temporal resolution than is possible with a frame-based video camera. Events may include an address of the location of the pixel that generated the event, a timestamp of the event, and a polarity to indicate whether the pixel increased or decreased in illumination (greater than a threshold value necessary to trigger the event). No events are generated for pixels that remain relatively constant, which is often the majority of the pixels.

A camera calibration circuit 108 is also shown. The calibration circuit 108 is configured to provide a cross correlation or reference between the pixels of the event-based camera 102 and the pixels in the frame-based camera 104, as will be described in greater detail below.

Figure 2:
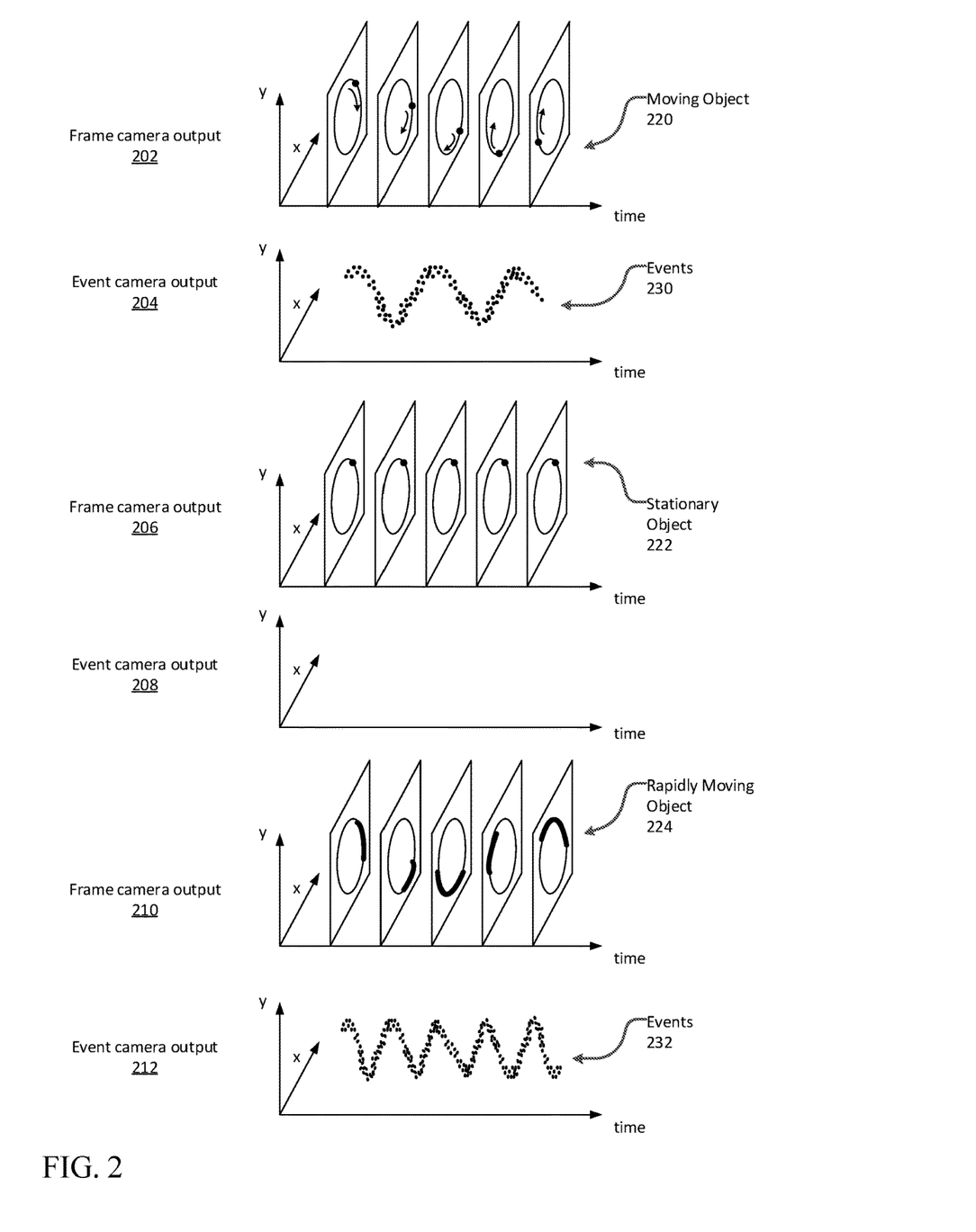
FIG. 2 illustrates a comparison of frame-based camera output and event-based camera output, in accordance with certain embodiments of the present disclosure.

FIG. 2 illustrates a comparison of frame-based camera output and event-based camera output, in accordance with certain embodiments of the present disclosure. Frame camera outputs 202, 206, and 210 each show a time sequence of image frames at regular intervals corresponding to the frame rate. The image frames are a 2D array of pixels in an x, y plane. In frame camera output 202, the temporal frames capture a moving object 220 that is revolving around a circular area. The full 2D image frame is captured, even though only the relatively small object 220 changes from frame to frame, while the rest of the pixels remain constant. Additionally, the frame capture rate is slow enough relative to the object speed that the object motion from one frame to the next is relatively large.

The corresponding event camera output 204 captures only the events 230 (indicated by dots) that are associated with pixel changes. The stream of events over time appears as a spiral or helix due to the circular motion of the object. Because the events are captured asynchronously, the temporal resolution of the event capture 204 is much greater than the frame rate of the frame capture 202. Each event includes a pixel address that provides correlation of the event to a pixel in the 2D image plane of the frame camera output, when camera cross calibration is taken into account. Each event also includes a timestamp which is used for integration and interpolation between frames, as described below.

Continuing with the next example illustrated in this figure, in frame camera output 206, the temporal frames capture a stationary object 222 and each frame is substantially identical to the previous frame. In this case, since there are no pixel changes and therefore no events, the event camera output 208 provides no data.

In the last case, frame camera output 210 captures a more rapidly moving object 224. Because the speed of the object is large relative to the frame capture rate, the object appears blurred. The corresponding event camera output 212, however, captures the pixel change events with greater temporal resolution resulting in the more tightly wound spiral of events 232.

The event-based camera may be configured to trigger events when the change in pixel illumination exceeds a threshold value, to control sensitivity and limit the number of generated events. In some embodiments, arbitration logic may be provided to handle simultaneous events. Since event detection is based on pixel signal differentials, which are generally smaller in value than the actual pixel values, there is less likelihood of overflow or saturation. Additionally, in some embodiments, logarithmic detection may be employed to further increase dynamic range and avoid saturation.

Figure 3:
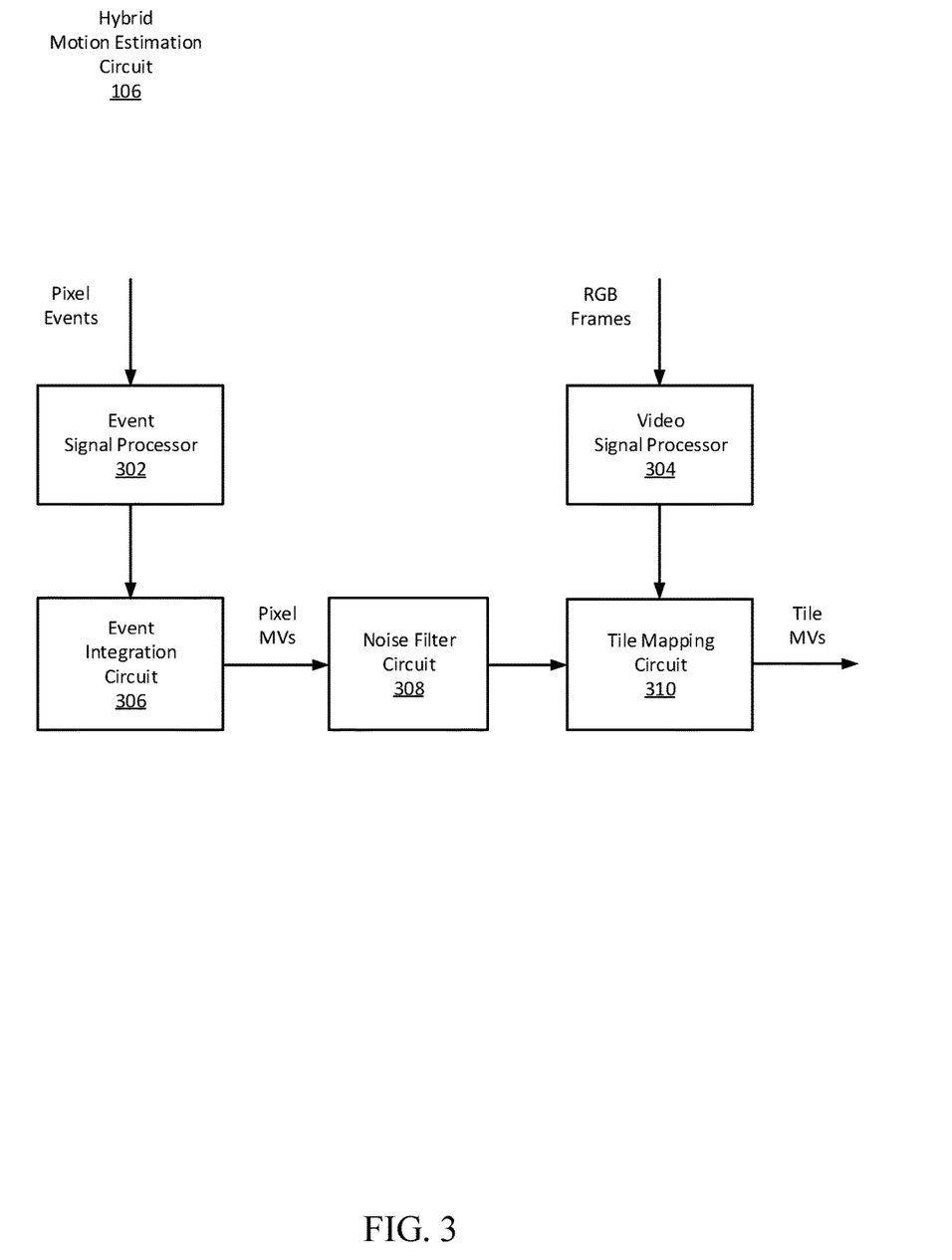
FIG. 3 is more detailed block diagram of a hybrid motion estimation circuit, configured in accordance with certain embodiments of the present disclosure.

FIG. 3 is more detailed block diagram of the hybrid motion estimation circuit 106, configured in accordance with certain embodiments of the present disclosure. The hybrid motion estimation circuit 106 is shown to include an event signal processor 302, a video signal processor 304, an event integration circuit 306, a noise filter circuit 308, and a tile mapping circuit 310.

The event signal processor 302 is configured to receive a sequence of pixel events, generated asynchronously by an event-based video camera 102. The events, which represent illumination change in a pixel, are captured asynchronously with relatively high temporal resolution. Events may include an address of the location of the pixel that generated the event and a timestamp, along with any other suitable data. The amount of illumination change required to trigger an event may be fixed or adjustable over a suitable range of values depending, for example, on the application and processing requirements. In some embodiments, the events may be provided directly from the camera to the event signal processor 302, for example in real-time. In some embodiments, the events may be captured in an offline manner and later retrieved from any suitable memory storage.

The video signal processor 304 is configured to receive a sequence of image frames generated by a frame-based video camera 104 at a frame sampling rate (or period). The image frames, which represent the image in a 2D pixel array, for example in an RGB or YUV format, are captured at a generally constant sampling rate with lower temporal resolution than the event captures. The video signal processor 304 is configured to subdivide the image frames into many smaller regions or tiles, for which motion vectors are desired. The tile size may be selected based on accuracy requirement, where smaller tiles (in larger numbers) generally provide greater accuracy. In some embodiments, the image frames may be provided directly from the camera to the video signal processor 302, for example in real-time. In some embodiments, the frames may be captured in an offline manner and later retrieved from any suitable memory storage.

In some embodiments, the event signal processor 302 and video signal processor 304 may be configured to perform additional tasks related to conformance with video standards, artefact removal, and the like.

The event integration circuit 306 is configured to integrate a subset (or all) of the sequence of pixel events, occurring within the frame sampling period between pairs of captured image frames. The integration is employed to generate a pixel motion vector representing motion of the pixel between those frames. In some embodiments, the subset of pixel events selected for integration depends on the application. For example, in a frame rate up-conversion application, as described below, where it is desired to insert a new interpolated frame between two existing frames (e.g., at a 2× up-convert rate), the pixel events may be integrated over half of the frame capture period to generate motion vectors used to predict the new frame at the halfway point. Similarly, for a 4× up-convert-rate, the pixel events may be integrated over each quarter segment of the frame capture period. Alternatively, in a video encoding application, as described below, where it is desired to predict a total motion between captured frames (to calculate residual errors for compressive encoding), the pixel events may be integrated over the entire frame capture period.

The noise filter circuit 308 is configured to apply noise reduction filtering to the pixel motion vectors. In some embodiments, this filtering may incorporate a regularization process to improve event accuracy and continuity across the image by smoothing over gaps (absent events in the neighborhood of active events) or erroneous outliers in the generated motion vectors.

The tile mapping circuit 310 is configured to spatially map the pixel motion vectors to one or more tiles of the image frames to generate an estimated tile motion vector associated with the tile. Pixel motion vectors are thus transformed to motion vectors for each tile in the video frame sequence which can be utilized by subsequent video processing applications such as frame rate up-conversion or video encoding. The mapping is based on a calibration process that correlates the locations of pixels in the 2-dimensional sensor planes of the event-based camera and the frame-based camera, as described below.

Figure 4:
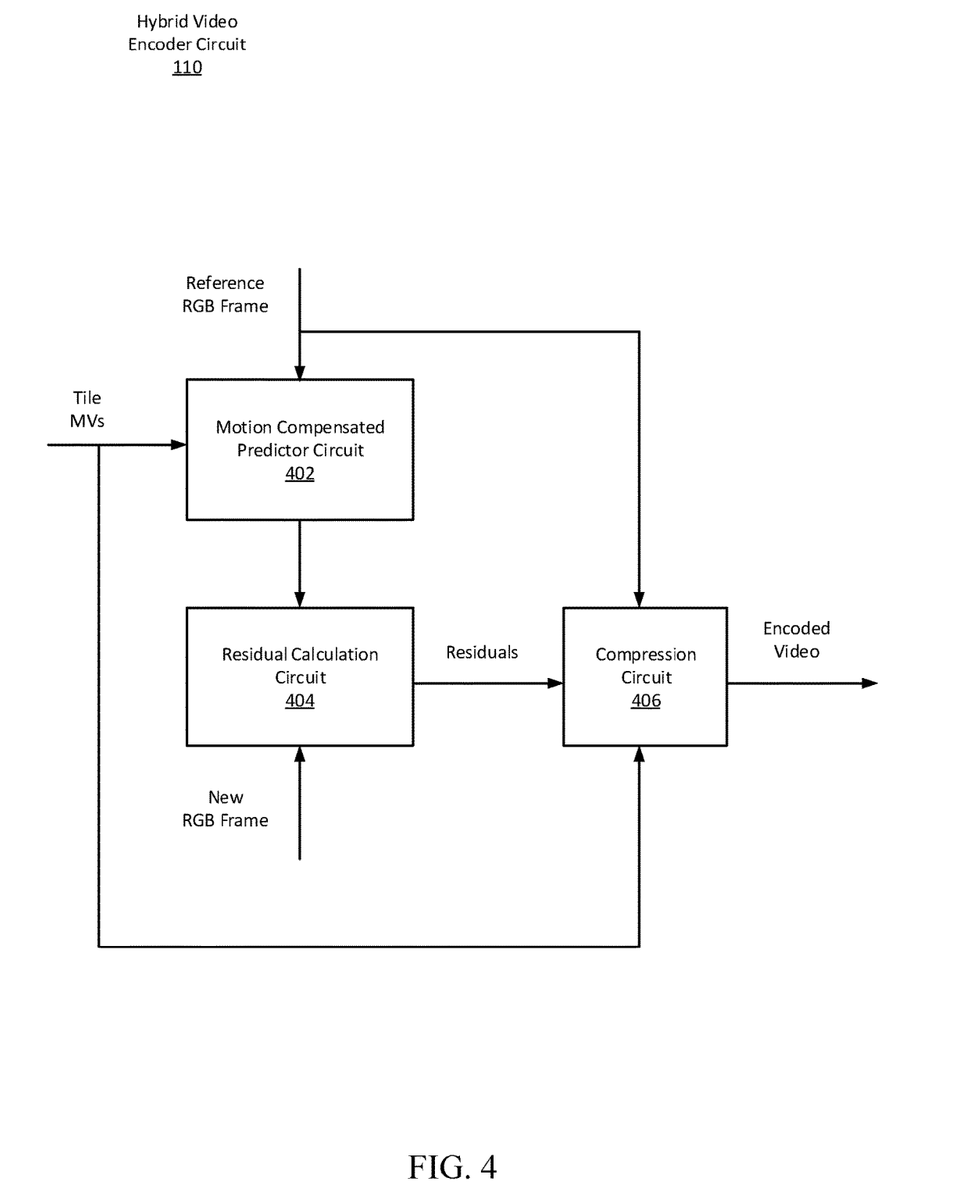
FIG. 4 is a more detailed block diagram of a hybrid video encoder circuit, configured in accordance with certain embodiments of the present disclosure.

FIG. 4 is a more detailed block diagram of a hybrid video encoder circuit 110, configured in accordance with certain embodiments of the present disclosure. The hybrid video encoder circuit 110 is shown to include a motion compensated predictor circuit 402, a residual calculation circuit 404, and a compression circuit 406.

The hybrid video encoder circuit 110 is configured to encode or compress the sequence of video image frames using motion compensated prediction based, at least in part, on the estimated tile motion vectors. The estimated motion vectors, which are generated from the pixel motion vectors based on the pixel events, represent the total motion of tiles between two image frames. The motion compensated predictor circuit 402 is configured to apply the motion vectors to a first video frame, used as a reference frame, to calculate a predicted second video frame. The residual calculation circuit 404 is configured to calculate the difference or error (i.e., residual) between the predicted second frame and the actual second frame. The compression circuit 406 is configured to compress the reference frame, motion vectors, and residuals to generate an encoded video stream. In some embodiments, the hybrid video encoder circuit 110 may use other known techniques in light of the present disclosure.

Figure 5:
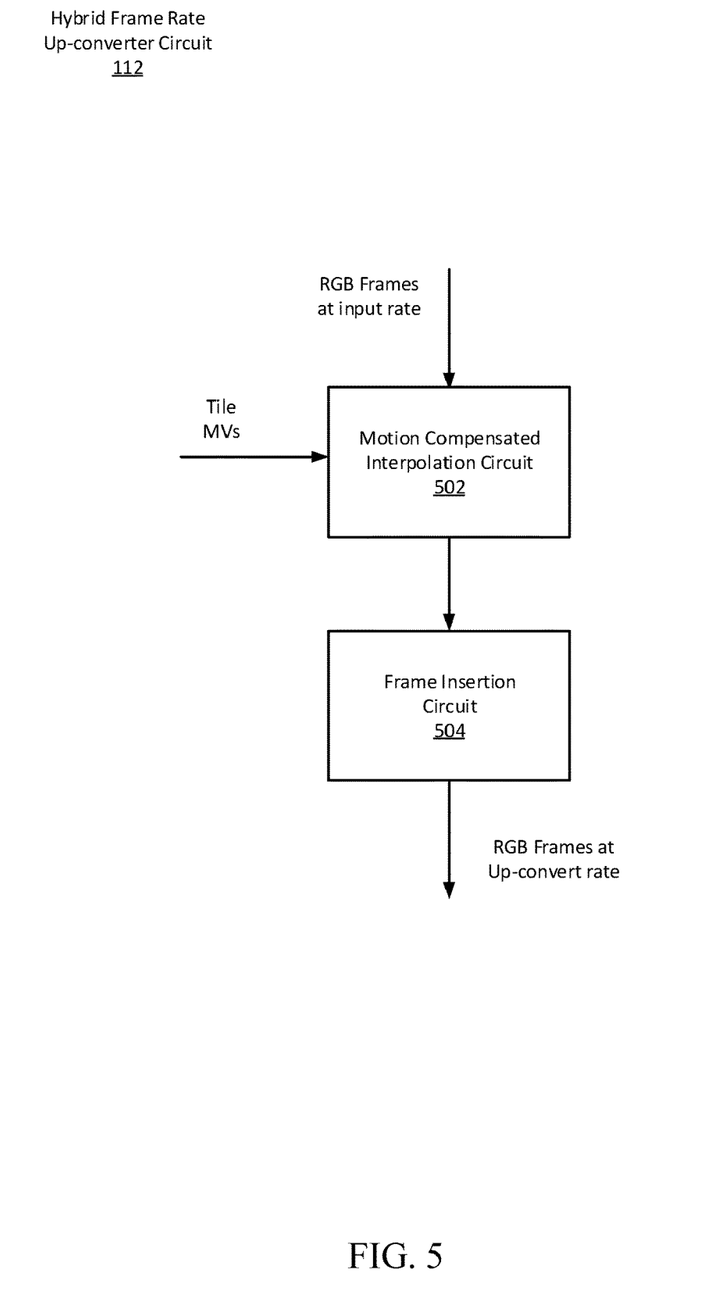
FIG. 5 is a more detailed block diagram of a hybrid frame rate up-converter circuit, configured in accordance with certain embodiments of the present disclosure.

FIG. 5 is a more detailed block diagram of a hybrid frame rate up-converter circuit 112, configured in accordance with certain embodiments of the present disclosure. The hybrid frame rate up-converter circuit 112 is shown to include a motion compensated interpolation circuit 502 and a frame insertion circuit 504.

The hybrid frame rate up-converter circuit 112 is configured to perform frame rate up-conversion on the sequence of image frames using motion compensated interpolation based, at least in part, on the estimated tile motion vectors. The estimated motion vectors, which are generated from the pixel motion vectors based on the pixel events, represent motion of the tiles over an up-converted frame period. The motion compensated interpolation circuit 502 is configured to generate interpolated video frames corresponding to time periods between the captured video frames by applying the tile motion vectors to tiles of a captured video frame to predict a new video frame at the next up-converted time period. This can be expressed, for example, by the equation $F(t+1/2)=F(t)+MV(t,t+1/2)$ in the case of 2× up-conversion, where F represents a frame tile or region (or in a limiting case an individual pixel) at the specified time and MV represents the motion vector between the two specified times. The frame insertion circuit 504 is configured to insert the predicted frames into the video frame stream to generate the up-converted frame stream. In some embodiments, the hybrid frame rate up-converter circuit 112 may use other known techniques in light of the present disclosure.

Figure 6:
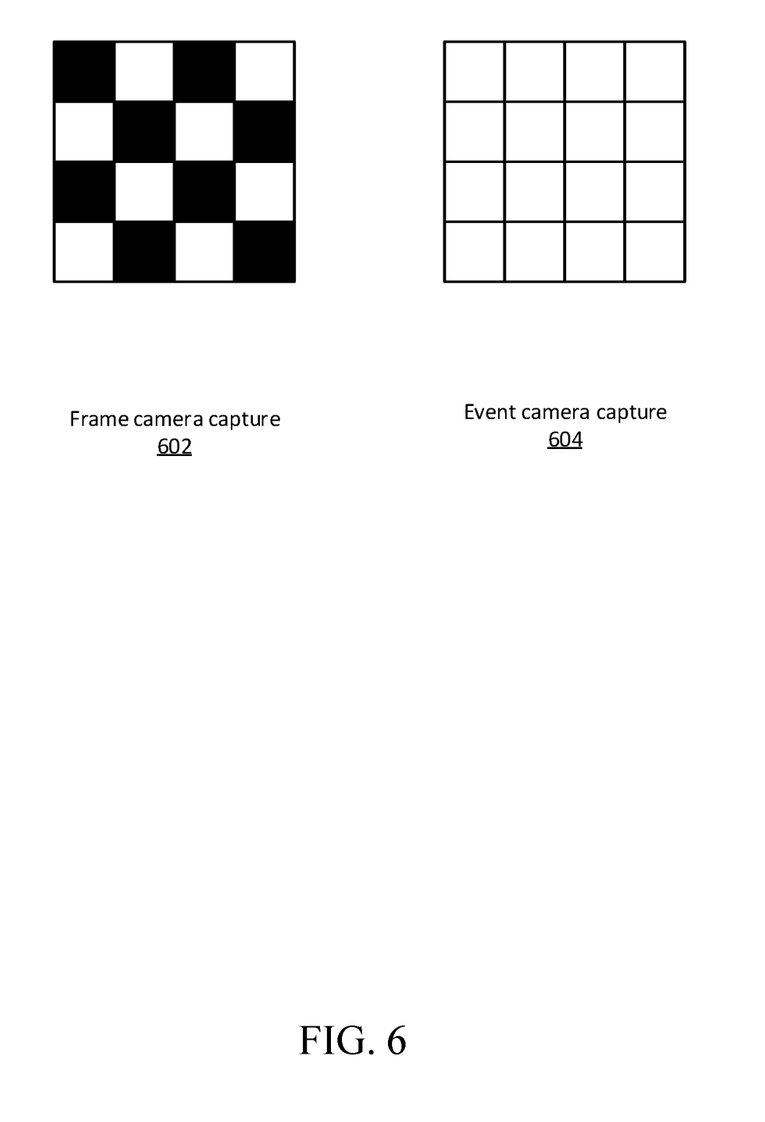
FIG. 6 illustrates example camera captures used for cross camera calibration, in accordance with certain embodiments of the present disclosure.

FIG. 6 illustrates example camera captures used for cross camera calibration, in accordance with certain embodiments of the present disclosure. The camera calibration circuit 108 is configured to provide a cross correlation or reference between the pixel addresses of the events provided by the event-based camera 102 and the pixels in the 2D frame provided by the frame-based camera 104. The images captured by the frame-based camera 104 may not align precisely with the view from the dynamic vision sensor of the event-based camera 102 due to differences in viewing angle or perspective, or differences in characteristics of the lenses or other features of the devices. In some embodiments, for purposes of calibration a moving checkerboard 602 may be captured by both cameras. A DVS sensor image may be chosen at a capture time that most closely matches the frame camera capture time. If necessary, an interpolation may be performed between two DVS images.

The moving checkerboard will appear as shown in 602 for the frame camera capture, and as shown in 604 for the event camera capture (which only shows pixel changes at the edges of the patterns). In some embodiments, as an alternative to moving the checkerboard pattern, a backlight of the screen that renders the checkerboard can be toggled on and off. The two images can then be compared to determine pixel-level correspondence between the images. The correspondence can be calculated using edge-detection, corner detection or other known techniques in light of the present disclosure. In some embodiments, the camera cross calibration process may be either pre-computed (e.g., offline) or performed in real-time, depending on requirements. Although these calibration techniques provide a global transformation between the images, in some case, due to the disparity of the cameras, more precise object matching may be necessary to find pixel-level correspondences. In some embodiments, this can be achieved through local-patch-based block matching techniques, for example using L2 distances, or through correlation methods such as motion-vector estimation techniques, or through metric learning for block-level differencing.

In some embodiments, other video processing applications may benefit from the hybrid motion vector calculation techniques described herein. For example, digital video stabilization to minimize camera shake effects can benefit from improved computation of optical flow based on the motion estimation techniques described herein. Similarly, always-on video surveillance systems can benefit from the reduced power consumption of a hybrid video system, where the image capture camera can remain in a sleep state until the even-based camera detects motion. Still other applications include video enhancement, where stylized renderings can be generated based on rapidly detected edges of moving objects that enable object image substitution or modification.

Methodology

Figure 7:
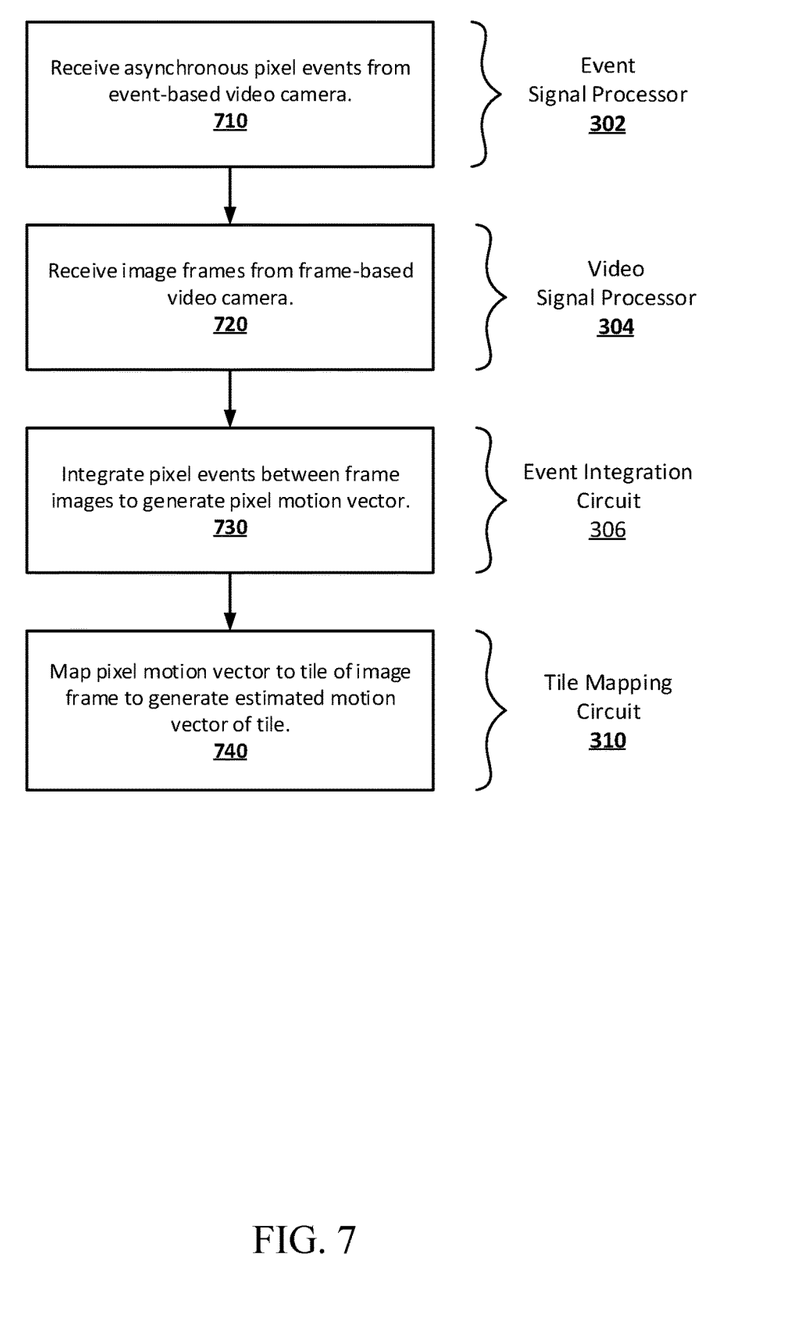
FIG. 7 is a flowchart illustrating a methodology for hybrid motion estimation, in accordance with certain embodiments of the present disclosure.

FIG. 7 is a flowchart illustrating an example method 700 for motion estimation using hybrid video imaging, in accordance with certain embodiments of the present disclosure. As can be seen, example method 700 includes a number of phases and sub-processes, the sequence of which may vary from one embodiment to another. However, when considered in the aggregate, these phases and sub-processes form a process for motion estimation in accordance with certain of the embodiments disclosed herein. These embodiments can be implemented, for example using the system architecture illustrated in FIGS. 1, 3, 4 and 5 as described above.

However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in one embodiment, method 700 for motion estimation using hybrid video imaging commences by receiving, at operation 710, a sequence of pixel events, generated by an event-based video camera. The event-based video camera, also referred to as a dynamic vision sensor, generates the events asynchronously, as they occur, avoiding acquisition delays that would be associated with a fixed rate sampling device such as a frame-based video camera. Events are associated with a change in pixel illumination, either an increase or a decrease, which exceeds a threshold value. In some embodiments, the generated events may include an address of the pixel associated with the event and a timestamp. The address may be a location relative to a 2-dimensional pixel array of the event-based video camera.

At operation 720, a sequence of image frames are received. The image frames are generated by a frame-based video camera at a frame sampling period. In some embodiments, the image frames may be in an RGB or YUV format. The image frames are subdivided into a number or regions or tiles. Next, at operation 730, a subset of the sequence of pixel events, for a given pixel, occurring within the frame sampling period between two of the image frames, are integrated to generate a pixel motion vector representing the motion of that pixel between the two image frames. At operation 740, the pixel motion vector is mapped to a tile of one of the image frames, to generate an estimated motion vector associated with that tile. The mapping is based on a calibration process that correlates the locations of pixels in the 2-dimensional sensor planes of the event-based camera and the frame-based camera.

Of course, in some embodiments, additional operations may be performed, as previously described in connection with the system. For example, video encoding (e.g., for compression) can be performed on the sequence of image frames. The encoding may use motion compensated prediction based on the estimated motion vectors, wherein the estimated motion vectors represent total motion of the tile between two image frames. Further additional operations may include performing frame rate up-conversion on the sequence of image frames using motion compensated interpolation. The interpolation may be based on the estimated motion vectors, wherein the estimated motion vectors represent motion of the tile over an up-converted frame period. In some embodiments, the estimated motion vectors may be provided for use by other video applications such as, for example, video stabilization, video surveillance, and video enhancement.

Example System

Figure 8:
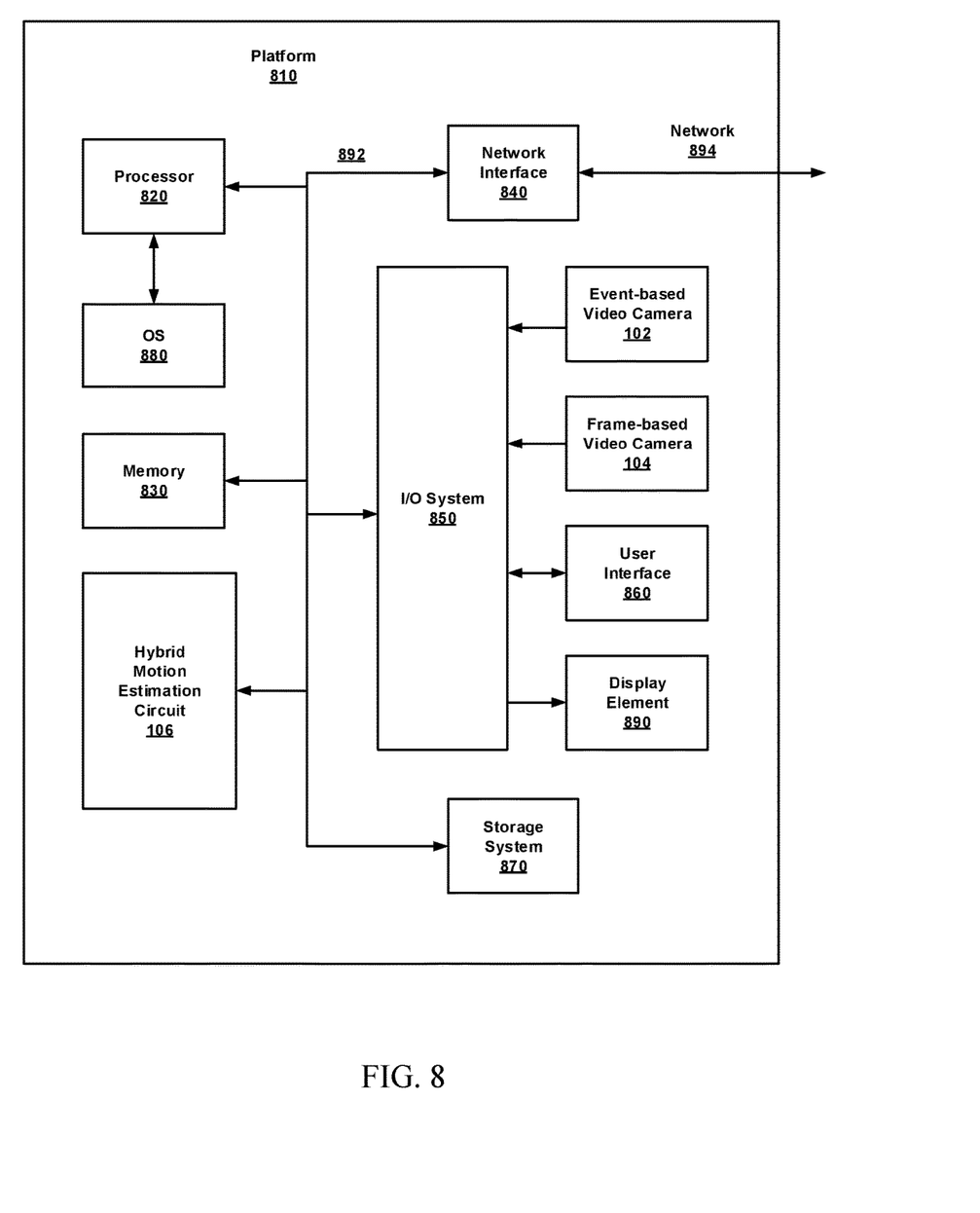
FIG. 8 is a block diagram schematically illustrating a system platform to perform hybrid motion estimation, configured in accordance with certain embodiments of the present disclosure.

FIG. 8 illustrates an example system 800 to perform motion estimation using hybrid video imaging, configured in accordance with certain embodiments of the present disclosure. In some embodiments, system 800 comprises a platform 810 which may host, or otherwise be incorporated into a personal computer, workstation, laptop computer, ultralaptop computer, tablet, touchpad, portable computer, handheld computer, palmtop computer, television (TV), smart TV, TV receiver/converter or setup box, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 810 may comprise any combination of a processor 820, a memory 830, a hybrid motion estimation circuit 106, a network interface 840, an input/output (I/O) system 850, an event-based video camera 102, a frame-based video camera 104, a user interface 860, a display element 890, and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), or Linux. As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to an event-based video camera 103, a frame-based video camera 104, a user interface 860, a display element 890, and other devices not shown such as a keyboard, mouse, speaker, etc.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Hybrid motion estimation circuit 106 is configured to estimate motion vectors using hybrid video imaging that incorporates both frame-based capture and event-based capture. Hybrid motion estimation circuit 106 may include any or all of the components illustrated in FIGS. 1, 3, 4 and 5, as described above. Hybrid motion estimation circuit 106 can be implemented or otherwise used in conjunction with a variety of suitable software and/or hardware that is coupled to or that otherwise forms a part of platform 810. Hybrid motion estimation circuit 106 can additionally or alternatively be implemented or otherwise used in conjunction with user I/O devices that are capable of providing information to, and receiving information and commands from, a user. These I/O devices may include display element 890, and other devices collectively referred to as user interface 860. In some embodiments, user interface 860 may include a textual input device such as a keyboard, and a pointer-based input device such as a mouse. Other input/output devices that may be used in other embodiments include a touchpad and/or a speaker. Still other input/output devices can be used in other embodiments.

In some embodiments, hybrid motion estimation circuit 106 may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the motion vector calculation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other applications, such as video surveillance, video enhancement, video stabilization, and/or other video processing applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a processor-implemented method for motion estimation. The method comprises: receiving a sequence of pixel events generated asynchronously by an event-based video camera; receiving a sequence of image frames generated by a frame-based video camera at a frame sampling period; integrating a subset of the sequence of pixel events, occurring within the frame sampling period between two of the image frames, to generate a pixel motion vector representing motion of the pixel between the two image frames; and mapping the pixel motion vector to a tile of one of the image frames to generate an estimated motion vector associated with the tile.

Example 2 includes the subject matter of Example 1, further comprising performing video encoding of the sequence of image frames using motion compensated prediction based on the estimated motion vectors, wherein the estimated motion vectors represent total motion of the tile between the two image frames.

Example 3 includes the subject matter of Examples 1 or 2, further comprising performing frame rate up-conversion on the sequence of image frames using motion compensated interpolation based on the estimated motion vectors, wherein the estimated motion vectors represent motion of the tile over an up-converted frame period.

Example 4 includes the subject matter of any of Examples 1-3, wherein the pixel events comprise an address of a pixel associated with the pixel event and a timestamp of the pixel event, the address is relative to a 2-dimensional pixel array of the event-based video camera.

Example 5 includes the subject matter of any of Examples 1-4, further comprising calibrating the 2-dimensional pixel array of the event-based video camera to a 2-dimensional pixel array of the frame-based video camera, wherein the mapping is based on the calibration.

Example 6 includes the subject matter of any of Examples 1-5, further comprising applying a noise reduction filter to the pixel motion vectors.

Example 7 includes the subject matter of any of Examples 1-6, further comprising performing additional video applications based on the estimated motion vector, the additional video applications comprising one or more of video stabilization, video surveillance, and video enhancement.

Example 8 includes the subject matter of any of Examples 1-7, wherein the pixel events are triggered by a change in illumination of the pixel that exceeds a threshold value.

Example 9 is a system for motion estimation. The system comprises: an event signal processor to receive a sequence of pixel events, generated asynchronously by an event-based video camera; a video signal processor to receive a sequence of image frames generated by a frame-based video camera at a frame sampling period; an event integration circuit to integrate a subset of the sequence of pixel events, occurring within the frame sampling period between two of the image frames, to generate a pixel motion vector representing motion of the pixel between the two image frames; and a tile mapping circuit to map the pixel motion vector to a tile of one of the image frames to generate an estimated motion vector associated with the tile.

Example 10 includes the subject matter of Example 9, further comprising a hybrid video encoder circuit to encode the sequence of image frames using motion compensated prediction based on the estimated motion vectors, wherein the estimated motion vectors represent total motion of the tile between the two image frames.

Example 11 includes the subject matter of Examples 9 or 10, further comprising a hybrid frame rate up-converter circuit to perform frame rate up-conversion on the sequence of image frames using motion compensated interpolation based on the estimated motion vectors, wherein the estimated motion vectors represent motion of the tile over an up-converted frame period.

Example 12 includes the subject matter of any of Examples 9-11, wherein the pixel events comprise an address of a pixel associated with the pixel event and a timestamp of the pixel event, the address is relative to a 2-dimensional pixel array of the event-based video camera.

Example 13 includes the subject matter of any of Examples 9-12, further comprising a camera calibration circuit to calibrate the 2-dimensional pixel array of the event-based video camera to a 2-dimensional pixel array of the frame-based video camera, wherein the mapping is based on the calibration.

Example 14 includes the subject matter of any of Examples 9-13, further comprising a noise filter circuit to apply noise reduction filtering to the pixel motion vectors.

Example 15 includes the subject matter of any of Examples 9-14, further comprising additional video application circuits, the video applications based on the estimated motion vector, the additional video applications comprising one or more of video stabilization, video surveillance, and video enhancement.

Example 16 includes the subject matter of any of Examples 9-15, wherein the pixel events are triggered by a change in illumination of the pixel that exceeds a threshold value.

Example 17 is at least one non-transitory computer readable storage medium having instructions encoded thereon that, when executed by one or more processors, result in the following operations for motion estimation. The operations comprise: receiving a sequence of pixel events, generated asynchronously by an event-based video camera; receiving a sequence of image frames generated by a frame-based video camera at a frame sampling period; integrating a subset of the sequence of pixel events, occurring within the frame sampling period between two of the image frames, to generate a pixel motion vector representing motion of the pixel between the two image frames; and mapping the pixel motion vector to a tile of one of the image frames to generate an estimated motion vector associated with the tile.

Example 18 includes the subject matter of Example 17, the operations further comprising performing video encoding of the sequence of image frames using motion compensated prediction based on the estimated motion vectors, wherein the estimated motion vectors represent total motion of the tile between the two image frames.

Example 19 includes the subject matter of Examples 17 or 18, the operations further comprising performing frame rate up-conversion on the sequence of image frames using motion compensated interpolation based on the estimated motion vectors, wherein the estimated motion vectors represent motion of the tile over an up-converted frame period.

Example 20 includes the subject matter of any of Examples 17-19, wherein the pixel events comprise an address of a pixel associated with the pixel event and a timestamp of the pixel event, the address is relative to a 2-dimensional pixel array of the event-based video camera.

Example 21 includes the subject matter of any of Examples 17-20, the operations further comprising calibrating the 2-dimensional pixel array of the event-based video camera to a 2-dimensional pixel array of the frame-based video camera, wherein the mapping is based on the calibration.

Example 22 includes the subject matter of any of Examples 17-21, the operations further comprising applying a noise reduction filter to the pixel motion vectors.

Example 23 includes the subject matter of any of Examples 17-22, the operations further comprising performing additional video applications based on the estimated motion vector, the additional video applications comprising one or more of video stabilization, video surveillance, and video enhancement.

Example 24 includes the subject matter of any of Examples 17-23, wherein the pixel events are triggered by a change in illumination of the pixel that exceeds a threshold value.

Example 25 is a system for motion estimation. The system comprises: means for receiving a sequence of pixel events, generated asynchronously by an event-based video camera; means for receiving a sequence of image frames generated by a frame-based video camera at a frame sampling period; means for integrating a subset of the sequence of pixel events, occurring within the frame sampling period between two of the image frames, to generate a pixel motion vector representing motion of the pixel between the two image frames; and means for mapping the pixel motion vector to a tile of one of the image frames to generate an estimated motion vector associated with the tile.

Example 26 includes the subject matter of Example 25, further comprising means for performing video encoding of the sequence of image frames using motion compensated prediction based on the estimated motion vectors, wherein the estimated motion vectors represent total motion of the tile between the two image frames.

Example 27 includes the subject matter of Examples 25 or 26, further comprising means for performing frame rate up-conversion on the sequence of image frames using motion compensated interpolation based on the estimated motion vectors, wherein the estimated motion vectors represent motion of the tile over an up-converted frame period.

Example 28 includes the subject matter of any of Examples 25-27, wherein the pixel events comprise an address of a pixel associated with the pixel event and a timestamp of the pixel event, the address is relative to a 2-dimensional pixel array of the event-based video camera.

Example 29 includes the subject matter of any of Examples 25-28, further comprising means for calibrating the 2-dimensional pixel array of the event-based video camera to a 2-dimensional pixel array of the frame-based video camera, wherein the mapping is based on the calibration.

Example 30 includes the subject matter of any of Examples 25-29, further comprising means for applying a noise reduction filter to the pixel motion vectors.

Example 31 includes the subject matter of any of Examples 25-30, further comprising means for performing additional video applications based on the estimated motion vector, the additional video applications comprising one or more of video stabilization, video surveillance, and video enhancement.

Example 32 includes the subject matter of any of Examples 25-31, wherein the pixel events are triggered by a change in illumination of the pixel that exceeds a threshold value.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for motion estimation, the method comprising:
    receiving, by a processor, a sequence of pixel events, generated asynchronously by an event-based video camera;
    receiving, by the processor, a sequence of image frames generated by a frame-based video camera at a frame sampling period;
    integrating, by the processor, a subset of the sequence of pixel events, occurring within the frame sampling period between two of the image frames, to generate a pixel motion vector representing motion of the pixel between the two image frames; and
    mapping, by the processor, the pixel motion vector to a tile of one of the image frames to generate an estimated motion vector associated with the tile.

2. The method of claim 1, further comprising performing video encoding of the sequence of image frames using motion compensated prediction based on the estimated motion vectors, wherein the estimated motion vectors represent total motion of the tile between the two image frames.

3. The method of claim 1, further comprising performing frame rate up-conversion on the sequence of image frames using motion compensated interpolation based on the estimated motion vectors, wherein the estimated motion vectors represent motion of the tile over an up-converted frame period.

4. The method of claim 1, wherein the pixel events comprise an address of a pixel associated with the pixel event and a timestamp of the pixel event, the address is relative to a 2-dimensional pixel array of the event-based video camera.

5. The method of claim 4, further comprising calibrating the 2-dimensional pixel array of the event-based video camera to a 2-dimensional pixel array of the frame-based video camera, wherein the mapping is based on the calibration.

6. The method of claim 1, further comprising applying a noise reduction filter to the pixel motion vectors.

7. The method of claim 1, further comprising performing additional video applications based on the estimated motion vector, the additional video applications comprising one or more of video stabilization, video surveillance, and video enhancement.

8. The method of claim 1, wherein the pixel events are triggered by a change in illumination of the pixel that exceeds a threshold value.

9. A system for motion estimation, the system comprising:
an event signal processor to receive a sequence of pixel events, generated asynchronously by an event-based video camera;
a video signal processor to receive a sequence of image frames generated by a frame-based video camera at a frame sampling period;
an event integration circuit to integrate a subset of the sequence of pixel events, occurring within the frame sampling period between two of the image frames, to generate a pixel motion vector representing motion of the pixel between the two image frames; and
a tile mapping circuit to map the pixel motion vector to a tile of one of the image frames to generate an estimated motion vector associated with the tile.

10. The system of claim 9, further comprising a hybrid video encoder circuit to encode the sequence of image frames using motion compensated prediction based on the estimated motion vectors, wherein the estimated motion vectors represent total motion of the tile between the two image frames.

11. The system of claim 9, further comprising a hybrid frame rate up-converter circuit to perform frame rate up-conversion on the sequence of image frames using motion compensated interpolation based on the estimated motion vectors, wherein the estimated motion vectors represent motion of the tile over an up-converted frame period.

12. The system of claim 9, wherein the pixel events comprise an address of a pixel associated with the pixel event and a timestamp of the pixel event, the address is relative to a 2-dimensional pixel array of the event-based video camera.

13. The system of claim 12, further comprising a camera calibration circuit to calibrate the 2-dimensional pixel array of the event-based video camera to a 2-dimensional pixel array of the frame-based video camera, wherein the mapping is based on the calibration.

14. The system of claim 9, further comprising a noise filter circuit to apply noise reduction filtering to the pixel motion vectors.

15. The system of claim 9, further comprising additional video application circuits, the video applications based on the estimated motion vector, the additional video applications comprising one or more of video stabilization, video surveillance, and video enhancement.

16. The system of claim 9, wherein the pixel events are triggered by a change in illumination of the pixel that exceeds a threshold value.

17. At least one non-transitory computer readable storage medium having instructions encoded thereon that, when executed by one or more processors, result in the following operations for motion estimation, the operations comprising:
receiving a sequence of pixel events, generated asynchronously by an event-based video camera;
receiving a sequence of image frames generated by a frame-based video camera at a frame sampling period;
integrating a subset of the sequence of pixel events, occurring within the frame sampling period between two of the image frames, to generate a pixel motion vector representing motion of the pixel between the two image frames; and
mapping the pixel motion vector to a tile of one of the image frames to generate an estimated motion vector associated with the tile.

18. The computer readable storage medium of claim 17, the operations further comprising performing video encoding of the sequence of image frames using motion compensated prediction based on the estimated motion vectors, wherein the estimated motion vectors represent total motion of the tile between the two image frames.

19. The computer readable storage medium of claim 17, the operations further comprising performing frame rate up-conversion on the sequence of image frames using motion compensated interpolation based on the estimated motion vectors, wherein the estimated motion vectors represent motion of the tile over an up-converted frame period.

20. The computer readable storage medium of claim 17, wherein the pixel events comprise an address of a pixel associated with the pixel event and a timestamp of the pixel event, the address is relative to a 2-dimensional pixel array of the event-based video camera.

21. The computer readable storage medium of claim 20, the operations further comprising calibrating the 2-dimensional pixel array of the event-based video camera to a 2-dimensional pixel array of the frame-based video camera, wherein the mapping is based on the calibration.

22. The computer readable storage medium of claim 17, the operations further comprising applying a noise reduction filter to the pixel motion vectors.

23. The computer readable storage medium of claim 17, the operations further comprising performing additional video applications based on the estimated motion vector, the additional video applications comprising one or more of video stabilization, video surveillance, and video enhancement.

24. The computer readable storage medium of claim 17, wherein the pixel events are triggered by a change in illumination of the pixel that exceeds a threshold value.

* * * * *